(12) United States Patent
Wirola et al.

(10) Patent No.: US 11,579,237 B2
(45) Date of Patent: Feb. 14, 2023

(54) DETERMINING A PLURALITY OF INSTALLATION POSITIONS OF A PLURALITY OF RADIO DEVICES

(71) Applicant: HERE Global B.V., Eindhoven (NL)

(72) Inventors: Lauri Aarne Johannes Wirola, Tampere (FI); Petri Rauhala, Tampere (FI); Marko Luomi, Lempäälä (FI)

(73) Assignee: HERE Global B.V., Eindhoven (NL)

( * ) Notice: Subject to any disclaimer, the term of this patent is extended or adjusted under 35 U.S.C. 154(b) by 372 days.

(21) Appl. No.: 16/780,994

(22) Filed: Feb. 4, 2020

(65) Prior Publication Data

US 2020/0249310 A1     Aug. 6, 2020

(30) Foreign Application Priority Data

Feb. 4, 2019  (EP) .................................. 19155334

(51) Int. Cl.
| | |
|---|---|
| *G01S 5/02* | (2010.01) |
| *G01S 5/14* | (2006.01) |
| *G01S 13/76* | (2006.01) |

(52) U.S. Cl.
CPC .............. *G01S 5/0242* (2013.01); *G01S 5/14* (2013.01); *G01S 13/76* (2013.01)

(58) Field of Classification Search
CPC .......... G01S 5/0242; G01S 5/14; G01S 13/76
(Continued)

(56) References Cited

U.S. PATENT DOCUMENTS

| | | | |
|---|---|---|---|
| 8,589,532 B2 | 11/2013 | Tenny et al. | |
| 8,818,424 B2 | 7/2014 | Emadzadeh et al. | |
(Continued)

FOREIGN PATENT DOCUMENTS

| | | |
|---|---|---|
| WO | WO 2013/059636 A1 | 4/2013 |
| WO | WO 2013/176998 A2 | 11/2013 |

OTHER PUBLICATIONS

Extended European Search Report for Application No. 19155334.6 dated Aug. 6, 2019, 8 pages.
(Continued)

*Primary Examiner* — Bo Fan
(74) *Attorney, Agent, or Firm* — Alston & Bird LLP (57) ABSTRACT

A method, apparatus and computer readable storage medium are provided for determining the installation positions of radio devices. Signal propagation time parameters are obtained with each signal propagation time parameter associated with an installation position and an observation position. Each signal propagation time parameter represents a respective signal propagation time value of radio signal(s) traveling between the respective installation and observation positions. A signal propagation time parameter is selected for defining a coordinate system. First point coordinates are selected to represent the installation position associated with the selected signal propagation time parameter, and second point coordinates are selected to represent the observation position associated with the selected signal propagation time parameter. For each installation position represented by the first point coordinates, respective point coordinates are determined that represent the respective installation position at least partially based on the signal propagation time parameter and the first and second point coordinates.

18 Claims, 4 Drawing Sheets

(58) Field of Classification Search
USPC .................. 342/125, 463, 135, 148, 357.32
See application file for complete search history.

(56) References Cited

U.S. PATENT DOCUMENTS

| | | |
|---|---|---|
| 9,078,229 B1 | 7/2015 | Vannucci et al. |
| 9,432,964 B2 | 8/2016 | Garin et al. |
| 2014/0225779 A1* | 8/2014 | Kaufmann ................ G01S 1/04 342/463 |
| 2015/0289225 A1 | 10/2015 | Gao et al. |
| 2017/0127373 A1* | 5/2017 | Deshpande ......... H04W 12/069 |
| 2017/0215166 A1 | 7/2017 | Disatnik et al. |
| 2018/0255430 A1 | 9/2018 | Ivanov et al. |

OTHER PUBLICATIONS

U.S. Appl. No. 16/782,134, filed Feb. 5, 2020; In re: Ivanov; entitled *Determining of Absolute Altitudes of Floors of a Structure.*
U.S. Appl. No. 16/780,982, filed Feb. 4, 2020; In re: Wirola; entitled *Determining Motion Information Associated with a Mobile Device.*
Levenberg-Marquardt algorithm—Wikipedia [online] [retrieved Aug. 18, 2020]. Retrieved via the Internet: https://web.archive.org/web/20190131045229/https://en.wikipedia.org/wiki/Levenberg-Marquardt algorithm (dated Jan. 31, 2019) 6 pages.
Office Action for European Application No. 19155334.6 dated Sep. 10, 2021, 4 pages.

\* cited by examiner

DETERMINING A PLURALITY OF INSTALLATION POSITIONS OF A PLURALITY OF RADIO DEVICES

CROSS-REFERENCE TO RELATED APPLICATIONS

This application claims priority to European Application No. 19155334.6, filed Feb. 4, 2019, the entire contents of which are incorporated herein by reference.

FIELD OF THE DISCLOSURE

The invention relates to the field of radio positioning and more specifically to determining a plurality of installation positions of a plurality of radio devices.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems.

To enable positioning based on such non-GNSS based radio positioning systems, it is however necessary to determine the installation positions of the radio devices of positioning system. Currently, the installation positions of such radio devices are mostly manually captured which is a burdensome, time consuming and expensive procedure.

SUMMARY OF SOME EMBODIMENTS OF THE INVENTION

According to an exemplary aspect of the invention, a method for determining a plurality of installation positions of a plurality of radio devices is disclosed, wherein the method comprises:
  obtaining a plurality of signal propagation time parameters, wherein each of the plurality of signal propagation time parameters is associated with a respective installation position of the plurality of installation positions and a respective observation position, and wherein each of the plurality of signal propagation time parameters is representative of a respective signal propagation time value of one or more radio signals traveling between the respective installation position and the respective observation position,
  selecting a signal propagation time parameter of the plurality of signal propagation time parameters for defining a coordinate system, wherein first point coordinates of the coordinate system are selected to represent the installation position associated with the selected signal propagation time parameter, and second point coordinates of the coordinate system are selected to represent the observation position associated with the selected signal propagation time parameter,
  determining, for each of the plurality of installation positions apart from the installation position represented by the first point coordinates, respective point coordinates of the coordinate system representing the respective installation position at least partially based on the plurality of signal propagation time parameter and the first point coordinates and the second point coordinates.

The disclosed method may be performed by an apparatus. For example, the apparatus may be part of a radio positioning system (e.g. the below disclosed radio positioning system). In particular, the apparatus may be a positioning server of the radio positioning system.

The plurality of radio devices may be part of a radio positioning system (e.g. the below disclosed radio positioning system). By way of example, the plurality of radio devices and the apparatus performing the disclosed method may be part of the same radio positioning system (e.g. the below disclosed radio positioning system).

An installation position of a respective radio device of the plurality of radio devices may be understood to be a fixed position at which the respective radio device has been installed and/or is operated. For example, each of the plurality of radio devices may be configured to transmit a radio signal and/or to receive a radio signal.

It is to be understood that, for at least some (e.g. each) of the plurality of signal propagation time parameters, the respective installation position and the respective observation position associated with the respective signal propagation time parameter of the plurality of signal propagation time parameters is unknown (e.g. unknown before performing the disclosed method).

A respective signal propagation time parameter of the plurality of signal propagation time parameters may be understood to be associated with a respective installation position of the plurality of installation positions and a respective observation position if the respective signal propagation time parameter of the plurality of signal propagation time parameters is representative of a respective signal propagation time value of one or more radio signals traveling between the respective installation position and the respective observation position. Accordingly, the respective observation associated with a respective one of the of signal propagation time parameters may be understood to be an arbitrary position (e.g. a position of the mobile device) at which the respective signal propagation time value has been observed (e.g. determined).

The respective signal propagation time value of one or more radio signals traveling between the respective installation position and the respective observation position may be understood to be a round-trip-time value which represents the round-trip-time period it took for a first radio signal to travel from a mobile device located at the respective observation position to a radio device installed at the respective installation position and for a second radio signal to travel from the radio device to the mobile device. Accordingly, the round-trip-time value $RTT_{i,k}$ of radio signal travelling between the k-th installation position and the i-th observation position may be determined by the following equation:

$$RTT_{i,k} = (t_4 - t_1) - (t_3 - t_2)$$

where $t_1$ is the time-of-departure of the first radio signal from the mobile device located at the i-th observation position, $t_4$ is the time-of-arrival of the second radio signal at the mobile device, $t_3$ is the time-of-departure of the second radio signal from the radio device installed at the k-th installation position and $t_2$ is the time-of-arrival of the first radio signal at the radio device. For example, the mobile device located at the i-th observation position and the radio device installed at the k-th installation position may capture the respective times-of-arrival and times-of-departure. To enable the mobile device to determine the round-trip-time value, the radio device may communicate the time-of-departure of the second radio signal from the radio device and the time-of-arrival of the first radio signal at the radio device to the mobile device. Alternatively, the radio device may transmit the first radio signal and the mobile device may transmit the second radio signal. Both alternatives are to be understood to be within the scope of the present invention. Moreover, it is to be understood that the invention is not limited to these alternatives.

Further alternatively, the respective signal propagation time value may for example be understood to be a one-way-time value which represents the one-way-time period it took for a radio signal to travel in a one-way direction from one of the radio device installed at the respective installation position and the mobile device located at the respective observation position to the other one. Accordingly, the one-way-time value $OWT_{i,k}$ of radio signal travelling between the k-th installation position and the i-th observation position may be may be determined by the following equation:

$$OWT_{i,k} = t_1 - t_2$$

where $t_1$ is the time-of-departure of the radio signal and $t_2$ is the time-of-arrival of the radio signal. For example, the mobile device located at the i-th observation position and the radio device installed at the k-th installation position may capture the time-of-arrival and the time-of-departure. To enable the mobile device to determine the round-trip-time value, the radio device may communicate the time-of-departure of the radio signal or the time-of-arrival of the radio signal captured by the radio device to the mobile device. In contrast to determining a round-trip-time value, determining one-way-time value however requires that the clocks of the mobile device and the radio device are synchronized.

Accordingly, the respective observation associated with a respective one of the of signal propagation time parameters may be understood to be the position of the mobile device when observing (e.g. determining) the respective signal propagation time value represented by the respective one of the of signal propagation time parameters.

For example, each of the plurality of signal propagation time parameters is representative of a respective signal propagation time value determined by a respective mobile device of a plurality of mobile devices at least partially based on respective time(s)-of-departure and time(s)-of-arrival captured by the respective mobile device and a respective radio device of the plurality of radio devices. Accordingly, the plurality of signal propagation time parameters may be obtained by receiving the plurality of signal propagation time parameters from the plurality of radio devices. For example, the plurality of signal propagation time parameters may not be received at once from the plurality of mobile devices, but may at least partially be received subsequently from the plurality of mobile devices.

That each of the plurality of signal propagation time parameter is representative of a respective signal propagation time value may be understood to mean that (1) the respective signal propagation time parameter contains or represents the respective signal propagation time value or that (2) the respective signal propagation time parameter contains or represents a respective value that is a function of the respective signal propagation time value. For example, a respective distance value representing the distance between the respective installation position and the respective observation position is a function of the respective signal propagation time value. In particular, the respective distance value $d_{i,k}$ between the k-th installation position and the i-th observation position may be determined based on the respective signal propagation time value representing a round-trip-time value $RTT_{i,k}$ or a one-way-time value $OWT_{i,k}$ by one of the following equations:

$$d_{i,k} = RTT_{i,k} \cdot \frac{c}{2}$$
$$d_{i,k} = OWT_{i,k} \cdot c$$

where c is the speed of light.

The signal propagation time parameter of the plurality of signal propagation time parameters selected for defining the coordinate system may be an arbitrary signal propagation time parameter of the plurality of signal propagation time parameters.

The coordinate system may be a two-dimensional or three-dimensional coordinate system. For example, the coordinate system may be one of (1) a Cartesian coordinate system, (2) a polar coordinate system, (3) a cylindrical coordinate system and (4) a spherical coordinate system, to name a few non limiting examples.

Point coordinates of the coordinate system may be understood to define a position of a point in the coordinate system.

Moreover, the coordinate system may be a local coordinate system which may be understood to mean that it is not fixed to a fixed point on earth such that point coordinates of the local coordinate system may be (e.g. only) used for defining or representing a relative location of a position. In contrast to this, a global coordinate system may be understood to be fixed to a fixed point on earth such that geographical coordinates of such a global coordinate system may be used for defining or representing an absolute position.

Defining the coordinate system may be performed by selecting first point coordinates of the coordinate system to represent the installation position associated with the selected signal propagation time parameter and by selecting second point coordinates of the coordinate system to represent the observation position associated with the selected signal propagation time parameter.

The points in the coordinate system defined by the first and second point coordinates selected to represent the respective installation position and the respective observation position may be considered to represent the respective installation position and the respective observation position relative to each other. In other words, these points may be considered to be a representation of the relative locations of the respective installation position and the respective observation position. Therein, relative locations of two or more positions may be understood to represent the orientation and distance between the two or more positions relative to each other. For example, the distance between these points in the coordinate system defined by the first and second point coordinates may be considered to be a representation of the distance between the respective installation position and the respective observation position; and the direction from one of the points to the other one may be considered to be a representation of the direction from one of the respective installation position and the respective observation position to the other one.

Accordingly, mapping rules for mapping any position based on its relative location to one of the respective installation position and the respective observation position represented by the first and second point coordinates to a respective point in the coordinate system may be considered to be defined by selecting the first point coordinates of the coordinate system to represent the installation position associated with the selected signal propagation time parameter and by selecting second point coordinates of the coordinate system to represent the observation position associated with the selected signal propagation time parameter. Accordingly, defining the coordinate system may be understood to mean that such mapping rules are defined.

Determining, for each of the plurality of installation positions apart from the installation position represented by the first point coordinates, respective point coordinates of the coordinate system representing the respective installation position may be performed according to predetermined rules like a predetermined algorithm and/or predetermined equations. For example, the plurality of signal propagation time parameter and the first point coordinates and the second point coordinates may be used as input parameters of such a predetermined algorithm and/or as parameters of such predetermined equations.

These point coordinates obtained as a result of the determining together with the first point coordinates may form a first plurality of point coordinates. For example, the determining may be performed such that the first plurality of point coordinates is a representation of relative locations of the plurality of installation positions. To this end, the above disclosed mapping rules, for example in the form of the first and second point coordinates, may be considered when determining the point coordinates.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code (e.g. computer program code as disclosed below) for realizing the required functions, a memory storing the computer program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code (e.g. computer program code as disclosed below), the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(s) may be (a) module(s) or component(s) for (a) device(s), for example (a) chip(s) or chipset(s). Alternatively, the disclosed apparatus(es) may be (a) device. Examples of such (a) device(s) are (1) a mobile device, (2) a server and (3) a plurality of servers (e.g. forming a server cloud).

It is to be understood that the disclosed apparatus(es) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a radio positioning system is disclosed which comprises the plurality of radio devices and at least one of the disclosed apparatus(es). For example, the apparatus may be a server like a positioning server or part of a plurality of servers like a positioning cloud.

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors of the apparatus. The computer program code could be stored in the computer readable storage medium in the form of instructions encoding the computer-readable storage medium. The computer readable storage medium may be intended for taking part in the operation of an apparatus, like an internal or external hard disk of the device, or be intended for distribution of the computer program code, like an optical disc.

According to a further exemplary aspect of the invention, a computer program code is disclosed, the computer program code when executed by a processor (or by a plurality of processors) of an apparatus causing the apparatus to perform any one embodiment of the disclosed method (e.g. the steps of any one embodiment of the disclosed method).

The disclosed method, apparatus(es), system, non-transitory computer readable storage medium and computer program code may be for determining a plurality of installation positions of a plurality of radio devices.

In the following, further features and embodiments of these exemplary aspects of the invention will be described.

According to an exemplary embodiment of the invention, the first point coordinates and the second point coordinates are selected such that a distance between the first point coordinates and the second point coordinates is proportional to the signal propagation time value represented by the selected signal propagation time parameter.

For example, the first point coordinates and the second point coordinates are selected such that the distance between the first point coordinates and the second point coordinates is a (e.g. scaled or unscaled) representation of the distance between the respective installation position and the respective observation position.

As disclosed above, a respective distance value representing the distance between a respective installation position and a respective observation position associated with a respective signal propagation time parameter is a function of the respective signal propagation time value represented by the respective signal propagation time parameter. If it is assumed that the first point coordinates represent the first installation position (i.e. k=1) and the second point coordinates represent the first observation position (i=1), the respective distance value $d_{1,1}$ may be determined based on the respective signal propagation time value representing a round-trip-time value $RTT_{1,1}$ or a one-way-time value $OWT_{1,1}$ by one of the following equations:

$$d_{1,1} = RTT_{1,1} \cdot \frac{c}{2}$$

$$d_{1,1} = OWT_{1,1} \cdot c$$

where c is the speed of light.

Accordingly, if the first point coordinates are selected to be origin coordinates of a two-dimensional Cartesian coordinate system, the second point coordinates may be selected to be point coordinates defining a point on the X- or Y-axis of the coordinate system having a distance d from the origin point of the coordinate system. For example, the first point coordinates may then be represented by the following two-dimensional vector:

$$\underline{y_1} = \begin{pmatrix} 0 \\ 0 \end{pmatrix},$$

and the second point coordinates may then be represented by the following two-dimensional vector:

$$\underline{x_1} = \begin{pmatrix} 0 \\ d_{1,1} \end{pmatrix}.$$

According to an exemplary embodiment of the invention, one of the first point coordinates and the second point coordinates are origin coordinates of the coordinate system.

According to an exemplary embodiment of the invention, the method further comprises:

determining, for each of the observation positions apart from the observation position represented by the second point coordinates, respective point coordinates of the coordinate system representing the respective observation position at least partially based on the plurality of signal propagation time parameters and the first point coordinates and the second point coordinates.

The determining, for each of the observation positions apart from the observation position represented by the second point coordinates, respective point coordinates of the coordinate system representing the respective observation position may be understood to be performed like the determining, for each of the plurality of installation positions apart from the installation position represented by the first point coordinates, respective point coordinates of the coordinate system representing the respective installation position as disclosed above. In particular, the determining may be performed according to predetermined rules like a predetermined algorithm and/or predetermined equations. For example, the plurality of signal propagation time parameter and the first point coordinates and the second point coordinates may be used as input parameters of such a predetermined algorithm and/or parameters of such predetermined equations.

These point coordinates obtained as a result of the determining together with the second point coordinates may form a second plurality of point coordinates. For example, the determining may be performed such that the second plurality of point coordinates are a representation of relative locations of the plurality of observation positions. To this end, the above disclosed mapping rules, for example in the form of the first and second point coordinates, may be considered when determining the point coordinates.

According to an exemplary embodiment of the invention, the determining, for each of the plurality of installation positions apart from the installation position represented by the first point coordinates, respective point coordinates of the coordinate system representing the respective installation position comprises:

solving a non-linear equation system, wherein the non-linear equation system is formed by a plurality of signal propagation time equations, and wherein each of the plurality of signal propagation time equations is at least partially based on a respective signal propagation time value represented by a respective signal propagation time parameter of the plurality of signal propagation time parameters.

Accordingly, the determining, for each of the plurality of installation positions apart from the installation position represented by the first point coordinates, respective point coordinates of the coordinate system representing the respective installation position may further comprise determining the plurality of signal propagation time equations, for example by:

determining, for each of the plurality of signal propagation time parameters, a respective signal propagation time equation of the plurality of respective signal propagation time equations, wherein the point coordinates of the coordinate system representing the respective installation position associated with the respective signal propagation time parameter is an unknown variable of the respective signal propagation time equation, and wherein the respective signal propagation time value represented by the respective signal propagation time parameter is a parameter of the respective signal propagation time equation.

Examples of such a signal propagation time equation are:

$$c \cdot RTT_{i,k} = 2\|\underline{x_i} - \underline{y_k}\|$$

$$c \cdot OWT_{i,k} = \|\underline{x_i} - \underline{y_k}\|$$

where $\underline{x_i}$ represents the i-th observation position, $\underline{y_k}$ represents the k-th installation position, $RTT_{i,k}$ represents a round-trip-time value of a radio signal travelling between the k-th installation position and the i-th observation position, $OWT_{i,k}$ represents a one-way-time value of a radio signal travelling between the k-th installation position and the i-th observation position, and c represents the speed of light. Therein, the round-trip-time value $RTT_{i,k}$ or one-way-time value $OWT_{i,k}$ may be understood to be represented by a respective signal propagation time parameter of the plurality of signal propagation time parameters associated with the k-th installation position and the i-th observation position. Moreover, $\underline{x_i}$ and $\underline{y_k}$ may be two dimensional or three dimensional real vectors.

Without limiting the scope of the invention, it is assumed in the following for exemplary purposes that $\underline{x_i}$ and $\underline{y_k}$ are two dimensional vectors and that the coordinate system is a two dimensional Cartesian coordinate system. Considering the exemplary case that all k installation positions and all i observation positions are unknown, the plurality of signal propagation time parameters comprises i·k signal propagation time parameters and, thus, the number of signal propagation time equations is i·k. Moreover, the number of unknowns is 2·i+2·k (i.e. two point coordinates for each installation position and each observation position). By selecting the first point coordinates and the second point coordinates as disclosed above in more detail, the number of signal propagation time equations is reduced by 1 (i.e. i·k−1) and the number of unknowns by 4 (i.e. 2·i+2·k−4). Therefore, a necessary condition for the solving the non-linear equation system formed by the i·k signal propagation time equations is $$i \cdot k - 1 \geq 2k + 2i - 4$$
$$i \geq \frac{2k-3}{k-2} = \frac{2-3/k}{1-2/k}$$

For example, the first meaningful k is 3. Accordingly, k≥3 and i≥3 may be considered to be necessary condition for solving the non-linear equation system.

The non-linear equation system may for example be solved according to the Levenberg-Marquardt algorithm. For example, the problem defined by the non-linear equation system may be simply expressed as follows $$\underline{F}\begin{pmatrix} \underline{x} \\ \underline{y} \end{pmatrix} = \underline{0},$$

where $\underline{x}$ and $\underline{y}$ are the vectors representing point coordinates representing the k installation positions and the i observation positions, respectively. The solution of this problem determines, for each of the k installation positions and the i observation positions (e.g. apart from the first installation position and the first observation position), respective point coordinates such that the signal propagation time equations are fulfilled. Accordingly, the point coordinates obtained as a solution of the problem together with the first point coordinates and the second point coordinates may be considered to be a representation of relative locations of the plurality of installation positions (i.e. k installation positions) and the plurality of observation positions (i.e. i observation positions). Each of these point coordinates may be understood to represent one of (1) a respective installation position of the plurality of installation positions and (2) a respective observation position of the plurality of observation positions.

As disclosed above, the non-linear equation system may be solved in two dimensions as well as in three dimensions. If the non-linear equation system is solved in two dimensions, information regarding the longitude and the latitude of the installation positions may be obtained. By solving the non-linear equation system in three dimensions, in addition to information regarding the longitude and the latitude of the installation positions information regarding the altitude of the installation positions may be obtained as well. However, solving the non-linear equation system in three dimensions is less robust than solving the non-linear equation system in two dimensions. Moreover, if the radio devices are installed in an indoor environment like a building or a complex of buildings, it may be hard to clearly map the altitude information to floors of the building. It may thus be beneficial to solve the non-linear equation system in two dimensions and for each floor separately. To this end, it may firstly be determined (for example based on barometric or motion information captured by the respective mobile device(s)) on which floor a respective radio device resides.

According to an exemplary embodiment of the invention, the point coordinates of the coordinate system represent the plurality of installation positions of the plurality of radio devices relative to each other. This may be understood to mean that the point coordinates of the coordinate system define points in the coordinate system representing the plurality of installation positions of the plurality of radio devices relative to each other. In other words, these points may be considered to be a representation of the relative locations of the installation positions. Therein, relative locations of two or more positions may be understood to represent the orientation and distance between the two or more positions relative to each other.

According to an exemplary embodiment of the invention, the coordinate system is a two-dimensional coordinate system.

According to an exemplary embodiment of the invention, each of the plurality of radio devices resides on the same floor (e.g. the same floor of a building or a complex of a building). As disclosed above, it may for example be determined (for example based on barometric or motion information captured by the respective mobile device(s)) on which floor a respective radio device resides such that only installation positions of radio devices that are determined to reside on the same floor may be considered for the method. However, it is to be understood that, if it is determined that radio devices reside on more than one floor, the method may be performed separately for each floor such that the plurality of installation positions considered during each cycle of the method are installation positions of a plurality of radio devices that are determined to reside on the same floor.

According to an exemplary embodiment of the invention, the method may be performed separately for at least partially different sets of installation positions of radio devices. For example, the different sets of installation positions of radio devices may comprise installation positions of radio devices residing in different buildings and/or on different floors. Moreover, each of the different sets of installation positions of radio devices may be understood to represent a respective plurality of installation positions of a respective plurality of radio devices.

According to an exemplary embodiment of the invention, the method further comprises:

determining, for each of the point coordinates of the coordinate system representing the plurality of installation positions of the plurality of radio devices, a respective absolute position if position parameters representing at least three absolute positions of the installation positions of the plurality of installation positions and the observation positions associated with the plurality of signal propagation time parameters are obtained.

An absolute position may be understood to describe the location of the position based on or relative to a fixed position on earth. For example, an absolute position may be represented by geographical coordinates like longitude and latitude of a global coordinate system, for example coordinates according to WGS-84 (World Geodetic System 1984). WGS-84 is the standard U.S. Department of Defense definition of a global reference system for geospatial information and specifies a global coordinate system. It is presently available under: http://earth-info.nga.mil/GandG/publications/tr8350.2/wgs84fin.pdf.

As a result of the determining, for each of the point coordinates of the coordinate system representing the plurality of installation positions of the plurality of radio devices, respective geographical coordinates may be obtained.

If position parameters representing at least three absolute positions of the plurality of installation positions and the observation positions associated with the plurality of signal propagation time parameters are obtained, the coordinate system may be fixed by fixing or mapping the points in the coordinate system representing these at least three positions to their absolute positions. Based on the accordingly, fixed coordinate system (e.g. fixed to at least three fixed positions on earth), for each of the point coordinates of the coordinate system representing the plurality of installation positions of the plurality of radio devices, a respective absolute position may then be determined.

For example, if the radio devices are installed in an indoor environment, mobile devices which are located inside the indoor environment may not be able to determine their observation position absolutely, for example based on a GNSS-based positioning technology, when determining signal propagation time parameters. However, mobile devices outside of the indoor environment, but still in the vicinity of the indoor environment, may be able to determine their observation positions absolutely, for example based on a GNSS-based positioning technology, when determining signal propagation time parameters. The obtained position parameters may thus at least partially represent absolute positions of observation positions determined by one or more mobile device when determining signal propagation time parameters. Accordingly, the position parameters may at least partially be obtained by receiving the position parameters from the one or more mobile devices.

Alternatively or additionally, the absolute positions of some of the plurality of installation position of the plurality of radio devices may be known, for example by the operator of the plurality of radio devices. Accordingly, the obtained position parameters may thus at least partially represent such known absolute positions of installation positions. For example, the position parameters may at least partially be obtained by receiving the position parameters from a server of the network operator.

Alternatively, the obtained position parameters may at least partially represent manually captured absolute positions of installation positions. For example, the position parameters may at least partially be obtained by capturing user input representing the position parameters from a user.

According to an exemplary embodiment of the invention, the method further comprises at least one of:
- determining, at least partially based on the point coordinates of the coordinate system representing the plurality of installation positions of the plurality of radio devices, positioning support information representing the plurality of installation positions for determining a position estimate of a mobile device at least partially based on one or more signal propagation time value determined by the mobile device;
- determining, at least partially based the positioning support information and one or more signal propagation time value determined by a mobile device, a position estimate of the mobile device.

The positioning support information may be configured to enable a mobile device to determine a position estimate of its present position at least partially based on one or more signal propagation time value determined by the mobile device. To this end, the positioning support information may represent the plurality of installation positions of the plurality of radio devices in form of absolute positions (e.g. by containing or representing, for each of the plurality of installation positions, respective geographical coordinates) or relatively to each other (e.g. by containing or representing, for each of the plurality of installation positions, the respective point coordinates of the coordinate system)

For example, the positioning support information may be or represent a map representing the plurality of installation positions of the plurality of radio devices absolutely or relative to each other.

For example, if a mobile devices determines at least three different signal propagation time values each relating to the time period it took for a respective radio signal for travelling between the present position of the mobile device and a respective one of three different installation positions of the plurality of installation positions of the plurality of radio devices, a position estimate of the present position of the mobile device may be determined based on the at least three installation positions represented by the positioning support information by means of trilateration (e.g. by determining the distance between the present position and the three different installation positions based on the determined at least three different signal propagation time values). The position estimate may at least represent the present position of the mobile device relative to the at least three installation positions. If the positioning support information represent the at least three installation positions absolutely, the position estimate may represent the present position of the mobile device absolutely as well.

According to an exemplary embodiment of the invention, the plurality of signal propagation time parameters is obtained from a plurality of mobile devices, and wherein each of the of signal propagation time parameters is representative of a respective signal propagation time value determined by a respective mobile device of the plurality of mobile devices.

According to an exemplary embodiment of the invention, each of the radio devices of the plurality of radio devices is one of:
- a Bluetooth beacon; and
- an access point of a wireless local area network (WLAN).

A Bluetooth beacon may comprise a Bluetooth and/or Bluetooth low energy (BLE) radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals.

Such beacons can be easily installed at various installation positions and require little to no maintenance. For example, a plurality of beacons may be easily distributed across a certain area and may cover a certain area (e.g. a predetermined environment of the radio positioning system) with radio signals transmitted (e.g. broadcasted) by the beacons. Also, Bluetooth technologies are supported by many mobile devices by default such as most smartphones, most tablet computers, most notebook computers, most smart watches and most smart bands, etc. Using Bluetooth beacons may thus have the effect that many mobile devices may be able to receive radio signals transmitted by or communicate with the Bluetooth beacons without any adaptation of hardware. As a result, the approach may be globally scalable and have low maintenance and deployment costs. The beacons may be stand-alone devices or be integrated into or attached to some other device. Bluetooth beacons, in particular in low energy mode, require comparably little energy and the use of Bluetooth low energy may enable a positioning with limited energy consumption at all involved devices.

A Bluetooth beacon that is employed for the invention may be any kind of Bluetooth beacon complying with any present or future standard. The Bluetooth standards are specified by the Bluetooth Special Interest Group and are presently available under https://www.bluetooth.com/.

It is to be understood, however, that other types of radio nodes than variations of Bluetooth beacons may be used as well, for instance tags or other devices that are configured to transmit ultra-wideband (UWB) signals or any wireless radio signals that might emerge in the future.

For example, one or more radio devices of the plurality of radio devices may be an access point (e.g. a router) of a WLAN. Such an access point of a WLAN may comprise a WLAN radio interface, which for example includes a WLAN transceiver. The WLAN radio interface may be configured to transmit and/or receive WLAN radio signals. Accordingly, the radio signal transmitted by such an access point of a WLAN may be a WLAN radio signal. Like Bluetooth technologies, WLAN technologies are supported by many mobile devices by default such as most smartphones, most tablet computers, most notebook computers, most smart watches and most smart bands, etc.

WLAN is for example specified by the standards of the IEEE 802.11 family (http://www.ieee.org/). In particular, the IEEE 802.11mc standard specifies a solution for determining round-trip-time values between two WLAN devices, like a WLAN access point and a mobile device. Accordingly, the signal propagation time values represented by the plurality of signal propagation time parameters may be understood to be determined according to the IEEE 802.11mc standard.

According to an exemplary embodiment of the invention, each of the radio signal propagation time value is one of:
a round-trip-time value;
a one-way-time value.

According to an exemplary embodiment of the invention, the method is performed by a positioning server (e.g. a positioning server of a positioning system comprising the plurality of radio devices and the positioning server).

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
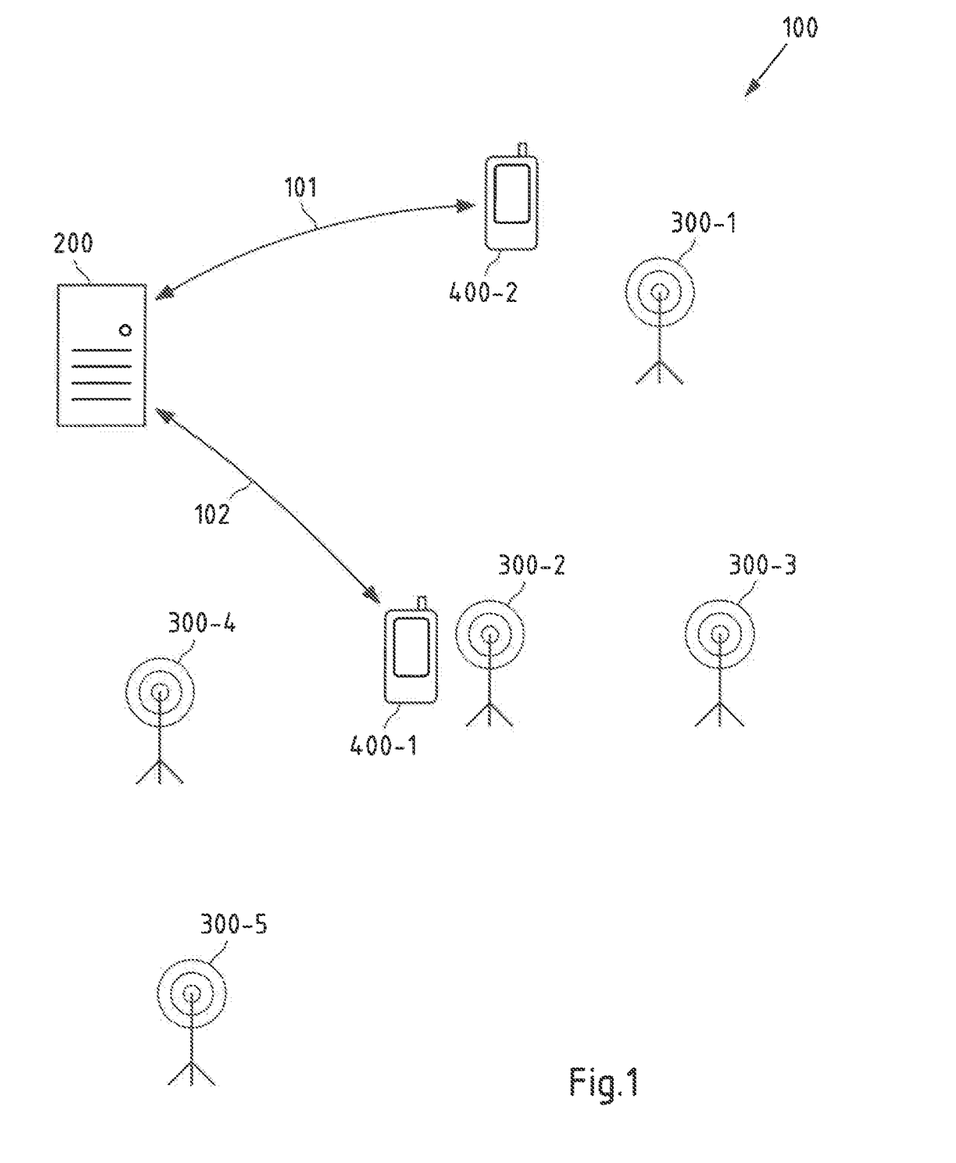
FIG. 1 is a block diagram of an exemplary embodiment of a system according to the invention.

FIG. 1 is a schematic high-level block diagram of a system 100 according to an exemplary aspect of the invention. In the following, it is assumed that system 100 is an indoor radio positioning system for a predetermined indoor environment.

The predetermined indoor environment of system 100 is for example inside a building or a complex of buildings like a shopping center, a parking garage, an airport, a company site, etc.

System 100 comprises a positioning server 200 and a plurality of radio devices 300-1 to 300-5. Optionally, system 100 may comprise a plurality of mobile devices 400-1 to 400-2. It is to be understood that system 100 may comprise further radio devices and mobile devices. In the following, it is thus referred to radio devices 300-1 to 300-5 and mobile devices 400-1 to 400-2 without limiting the scope of the invention.

For example, each of mobile devices 400-1 to 400-2 may be one of a smartphone, a tablet computer, a notebook computer, a smart watch and a smart band.

Indoor radio positioning system 100 is not limited to a single positioning server 200, but may optionally comprise a plurality of servers (e.g. forming a server cloud). Accordingly, the positioning server 200 may be part of such a plurality of servers (e.g. a server cloud) or may be represented by such a plurality of servers (e.g. a server cloud).

In system 100, positioning server 200 and mobile devices 400-1 to 400-2 may be configured to communicate with each other as indicated by communication paths 101 to 102, respectively. It is to be understood that communication paths 101 to 102 may comprise one or more communication links (e.g. one or more wireless communication links or one or more wireline communication links or a combination thereof). For example, communication paths 101 to 102 may include one or more communication links over one or more communication networks. For example, communication paths 101 and 102 are or include communication links over a cellular communication network like a 2G/3G/4G/5G cellular communication network. The 2G/3G/4G/5G cellular radio communication standards are developed by the 3GPP and presently available under http://www.3gpp.org/.

Radio devices 300-1 to 300-5 may be WLAN access points fixedly installed in the predetermined indoor environment of system 100 and may be configured for transmitting and receiving WLAN radio signals. For example, they may be configured for automatically and repeatedly transmitting WLAN radio signals (e.g. containing or representing a service set identifier (SSID) identifying the respective WLAN access point that has transmitted the respective WLAN radio signal). Furthermore, they may be configured to enable or support determining one or more round-trip-time values according to the IEEE 802.11mc standard. As disclosed above, WLAN is specified by the standards of the IEEE 802.11 family (http://www.ieee.org/). It is to be understood that system 100 is not limited to WLAN access points as radio devices 300-1 to 300-5. In the following, it is thus referred to radio devices 300-1 to 300-5 as WLAN access points 300-1 to 300-5 for exemplary purposes only without limiting the scope of the invention.

The mobile devices 400-1 to 400-2 may be configured for determining one or more round-trip-time values and for communicating one or more signal propagation time parameters representative of the determined one or more respective signal propagation time values to positioning server 200 (e.g. via one of communication paths 101 and 102). Moreover, mobile devices 400-1 to 400-2 may be configured for transmitting and receiving WLAN radio signals. For example, mobile devices 400-1 to 400-2 (like WLAN access points 300-1 to 300-5) may be configured to enable or support determining one or more round-trip-time values according to the IEEE 802.11mc standard.

As disclosed above, a round-trip-time value may be understood to represent the round-trip-time period it took for a first WLAN radio signal to travel from one of mobile devices 400-1 and 400-2 located at a respective observation position to one of the WLAN access points 300-1 to 300-5 installed at a respective installation position and for a second WLAN radio signal to travel from the respective WLAN access point to the respective mobile device.

Accordingly, the round-trip-time value $RTT_{i,k}$ of radio signal travelling between WLAN access points 300-1 installed at the k-th installation position and mobile device 400-1 located at the i-th observation position may be determined by the following equation:

$$RTT_{i,k}=(t_4-t_1)-(t_3-t_2)$$

where $t_1$ is the time-of-departure of the first WLAN radio signal from mobile device 400-1, $t_4$ is the time-of-arrival of the second WLAN radio signal at mobile device 400-1, $t_3$ is the time-of-departure of the second WLAN radio signal from WLAN access point 300-1 and $t_2$ is the time-of-arrival of the first WLAN radio signal at WLAN access point 300-1. For example, mobile device 400-1 may transmit the first WLAN radio signal and capture times $t_4$ and $t_1$, and WLAN access point 300-1 may transmit the second WLAN radio signal and capture times $t_3$ and $t_2$. To enable mobile device 400-1 to determine the round-trip-time value, WLAN access point 300-1 may furthermore communicate the time-of-departure $t_3$ of the second WLAN radio signal and the time-of-arrival $t_2$ of the first WLAN radio signal to the mobile device (e.g. by means of a further WLAN radio signal). Alternatively or additionally, it may be assumed that the time difference between the time-of-arrival $t_2$ of the first WLAN radio signal and the time-of-departure $t_3$ of the second WLAN radio signal is negligible or zero, for example it may be assumed that WLAN access point 300-1 transmits the second WLAN radio signal immediately in response to receiving the first WLAN radio signal.

In the following, it is assumed that each signal propagation time parameter represents such a round-trip-time value determined by one of mobile devices 400-1 and 400-2.

The indoor radio positioning server 200 may use these signal propagation time parameters for determining the installation positions WLAN access points 300-1 to 300-5 as disclosed below in more detail with respect to the flowchart 500 of FIG. 5.

Figure 2:
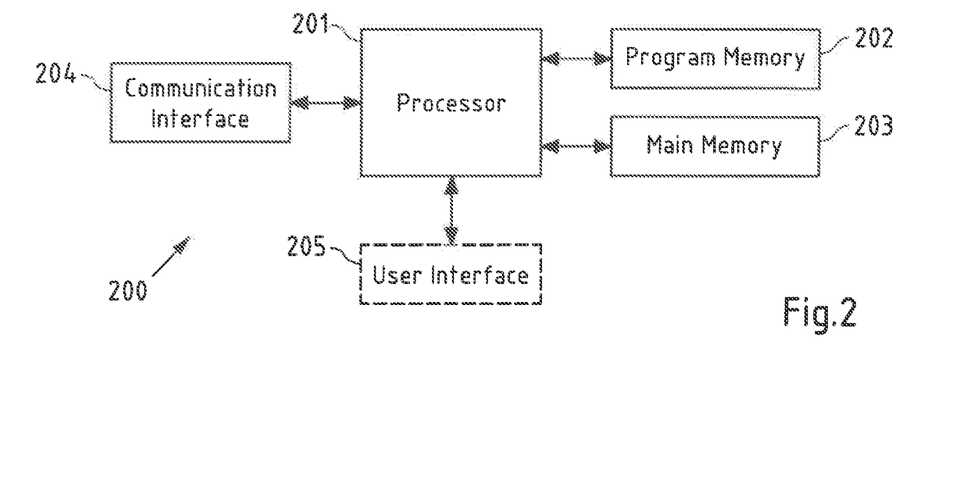
FIG. 2 is a block diagram of an exemplary embodiment of an apparatus according to the invention.

FIG. 2 is a block diagram of an exemplary embodiment of an apparatus according to the invention. In the following, it is assumed that this apparatus corresponds to positioning server 200 of system 100 of FIG. 1.

Positioning server 200 comprises a processor 201. Processor 201 may represent a single processor or two or more processors, which are for instance at least partially coupled, for instance via a bus. Processor 201 executes a program code stored in program memory 202 (for instance program code causing positioning server 200 to perform one or more of the embodiments of a method according to the invention or parts thereof (e.g. the method or parts of the method disclosed below with reference to flowchart 500 of FIG. 5), when executed on processor 201), and interfaces with a main memory 203. Program memory 202 may also contain an operating system for processor 201. Some or all of memories 202 and 203 may also be included into processor 201.

One of or both of a main memory and a program memory of a processor (e.g. program memory 202 and main memory 203) could be fixedly connected to the processor (e.g. processor 201) or at least partially removable from the processor, for instance in the form of a memory card or stick.

A program memory (e.g. program memory 202) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 203) may for instance be a volatile memory. It may for instance be a DRAM memory, to give non-limiting example. It may for instance be used as a working memory for a processor (e.g. processor 201) when executing an operating system and/or programs.

Processor 201 further controls a communication interface 204 which is for example configured to communicate via a network like a cellular communication network. Positioning server 200 may use communication interface 204 to communicate with mobile devices 400-1 and 400-2 (e.g. via one of communication paths 101 and 102).

Furthermore, processor 201 controls an optional user interface 205 configured to present information to a user of positioning server 200 and/or to receive information from such a user. User interface 205 may for instance be the standard user interface via which a user of positioning server 200 controls other functionality thereof. Examples of such a user interface are a touch-sensitive display, a keyboard, a touchpad, a display, etc.

The components 202 to 205 of positioning server 200 may for instance be connected with processor 201 by means of one or more serial and/or parallel busses.

It is to be understood that positioning server 200 may comprise various other components.

Figure 3:
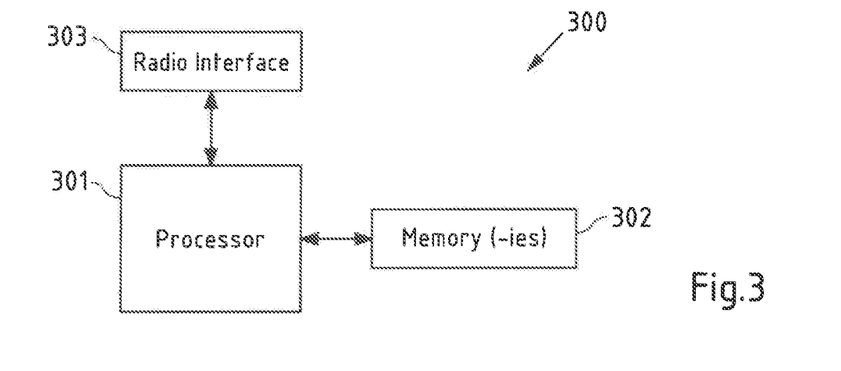
FIG. 3 is a block diagram of an exemplary embodiment of a radio device.

FIG. 3 is a block diagram of an exemplary embodiment of a radio device according to the invention. In the following, it is assumed that this radio device corresponds to a WLAN access point 300 like WLAN access points 300-1 to 300-5 of system 100.

WLAN access point 300 comprises a processor 301. Processor 301 may represent a single processor or two or more processors, which are for instance at least partially coupled, for instance via a bus. Processor 301 executes a program code stored in memory 302. Some or all of memory 302 may also be included into processor 301. Memory 302 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 301 when executing an operating system and/or programs. Memory 302 may also comprise an operating system for processor 301. Memory 302 may for instance comprise a first memory portion that is fixedly installed in BLE beacon 300, and a second memory portion that is removable from beacon 300, for instance in the form of a removable SD memory card.

Processor 301 further controls a radio interface 303 configured to receive and/or transmit WLAN radio signals. For instance, radio interface 303 may at least comprise a WLAN component including a WLAN transmitter (TX). The radio interface 303 may additionally comprise a WLAN receiver (RX). The transmitter and receiver may also be part of a WLAN transceiver (TRX). The WLAN transmitter enables WLAN access point 300 to transmit WLAN radio signals. Likewise, the WLAN receiver enables WLAN access point 300 to receive WLAN radio signals. Moreover, the radio interface 303 may be configured to support determining one or more round-trip-time values according to the IEEE 802.11mc standard, for example by capturing times-of-arrival and/or times-of-departure as disclosed above in more detail. It is to be understood that any computer program code based processing required for receiving and processing received WLAN radio signals may be stored in an own memory of the radio interface 303 and executed by an own processor of the radio interface 303 or it may be stored for example in memory 302 and executed for example by processor 301.

It is to be understood that BLE beacon 300 may comprise various other components.

Figure 4:
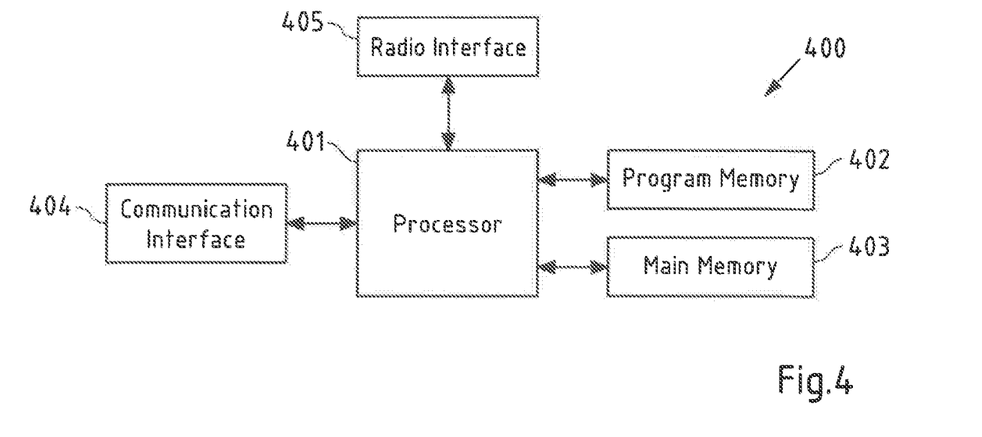
FIG. 4 is a block diagram of an exemplary embodiment of a mobile device.

FIG. 4 is a block diagram of an exemplary embodiment of a mobile device 400 according to the invention. In the following, it is assumed that this mobile device 400 corresponds to mobile devices 400-1 and 400-2 of system 100 of FIG. 1.

Mobile device 400 comprises a processor 401. Processor 401 may represent a single processor or two or more processors, which are for instance at least partially coupled, for instance via a bus. Processor 401 executes a program code stored in program memory 402 and interfaces with a main memory 403. Program memory 402 may also comprise an operating system for processor 401. Some or all of memories 402 and 403 may also be included into processor 401.

Processor 401 controls a communication interface 404 which is for example configured to communicate via a network like a cellular communication network. Mobile device 400 may use communication interface 404 to communicate with positioning server 200 (e.g. via one of communication paths 101 and 102).

Moreover, processor 401 controls radio interface 405 configured to receive and/or transmit WLAN radio signals. For instance, radio interface 405 may at least comprise a WLAN component including a WLAN transmitter (TX). The radio interface 303 may additionally comprise a WLAN receiver (RX). The transmitter and receiver may also be part of a WLAN transceiver (TRX). The WLAN transmitter enables mobile device 400 to transmit WLAN radio signals. Likewise, the WLAN receiver enables mobile device 400 to receive WLAN radio signals. Moreover, the radio interface 405 may be configured to support determining one or more round-trip-time values according to the IEEE 802.11mc standard, for example by capturing times-of-arrival and/or times-of-departure as disclosed above in more detail. It is to be understood that any computer program code based processing required for receiving and processing received WLAN radio signals may be stored in an own memory of the radio interface 405 and executed by an own processor of the radio interface 405 or it may be stored for example in memory 402 and executed for example by processor 401.

The components 402 to 405 of mobile device 400 may for instance be connected with processor 401 by means of one or more serial and/or parallel busses.

It is to be understood that mobile device 400 may comprise various other components. For example, mobile device 400 may optionally comprise a user interface (e.g. a touch-sensitive display, a keyboard, a touchpad, a display, etc).

Figure 5:
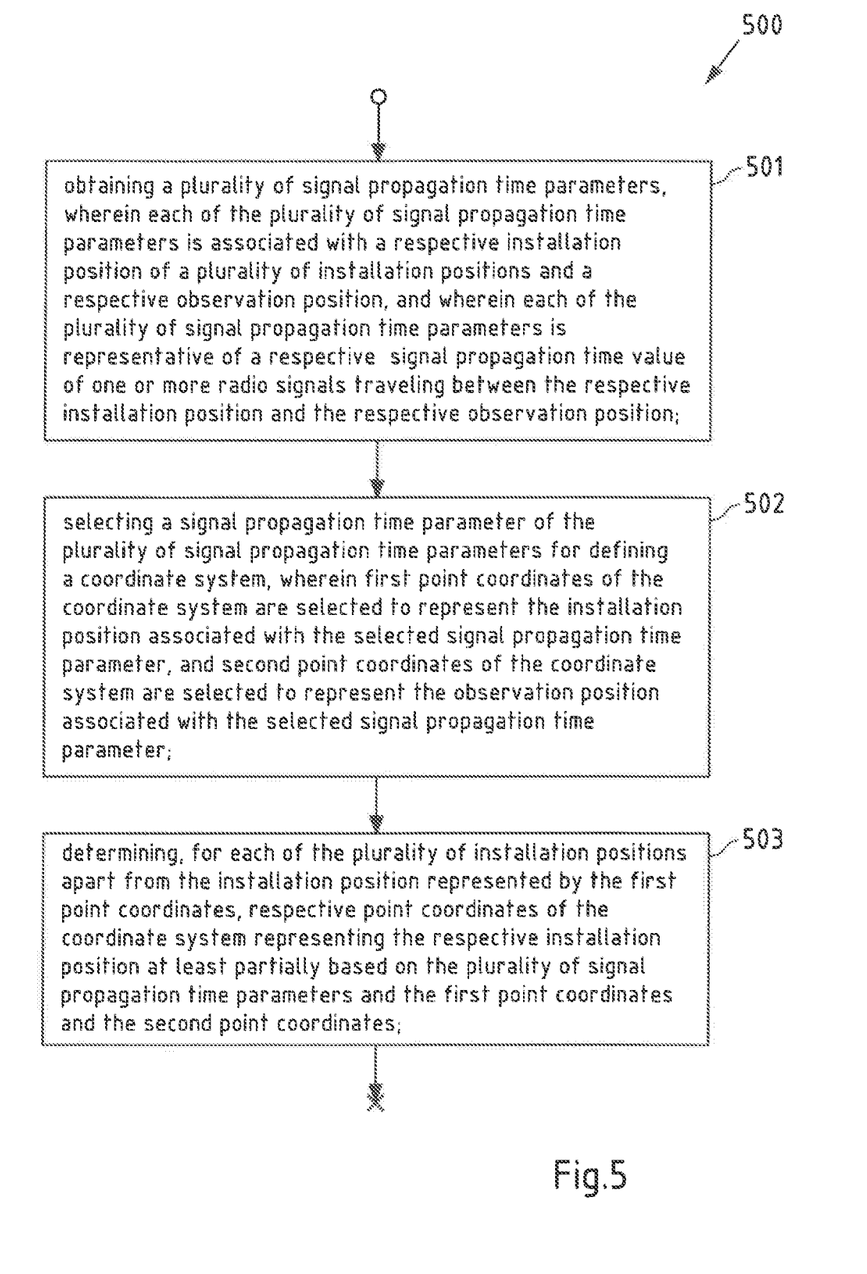
FIG. 5 is a flow chart illustrating an exemplary embodiment of a method according to the invention.

FIG. 5 is a flow chart 500 illustrating an exemplary embodiment of a method according to the invention. Without limiting the scope of the invention, it is assumed in the following that positioning server 200 of indoor radio positioning system 100 as described above with respect to FIG. 1 performs the steps of flowchart 500.

In step 501, a plurality of signal propagation time parameters are obtained by positioning server 200.

As disclosed above in more detail, the signal propagation time parameters of plurality of signal propagation time parameters may represent round-trip-time values determined by mobile devices 400-1 and 400-2. Accordingly, the may be received from mobile devices 400-1 and 400-2 via one of communication paths 101 and 102 in step 501.

For example, each signal propagation time parameter of the plurality of signal propagation time parameters represents a respective round-trip-time value determined by one of mobile devices 400-1 and 400-2. As disclosed in more detail above, a respective round-trip-time value $RTT_{i,k}$ may be understood to represent the round-trip-time period it took for a first WLAN radio signal to travel from one of mobile devices 400-1 and 400-2 located at the i-th observation position to one of the WLAN access points 300-1 to 300-5 installed at the k-th installation position and for a second WLAN radio signal to travel from the respective respective WLAN access point to the mobile device. Accordingly, the respective signal propagation time parameter of the plurality of signal propagation time parameters representing the respective round-trip-time value $RTT_{i,k}$ may be understood to be associated with the k-th installation position and the i-th observation position.

In the following, it is assumed that i·k signal propagation time parameters each of which representing a respective round-trip-time value $RTT_{i,k}$ are received in step 501 from mobile devices 400-1 and 400-2 and that k≥3 and i≥3. It is however to be understood that the signal propagation time parameters are not received at once in step 501, but may at least partially be received subsequently from mobile devices 400-1 and 400-2. For example, mobile devices may repeatedly transmit signal propagation time parameters representing newly determined round-trip-time values to positioning server 200.

For example, positioning server 200 collects the signal propagation time parameters received from mobile devices 400-1 and 400-2 for a predetermined period of time or until a predetermined number of signal propagation time parameters is reached before continuing the flowchart with step 502.

In step 502, a signal propagation time parameter of the plurality of signal propagation time parameters is selected for defining a coordinate system by positioning server 200. Therein, first point coordinates of the coordinate system are selected to represent the installation position associated with the selected signal propagation time parameter, and second point coordinates of the coordinate system are selected to represent the observation position associated with the selected signal propagation time parameter.

For exemplary purposes it is assumed in the following that the coordinate system is a local coordinate system and that it is a two-dimensional Cartesian coordinate system, that the first point coordinates are selected to be origin coordinates of the local coordinate system and that the second point coordinates are selected such that the distance between the first point coordinates and the second point coordinates is a (e.g. scaled or unscaled) representation of the distance between the respective installation position and the respective observation position. Moreover, it is assumed in the following that the first point coordinates represent the first installation position (i.e. k=1) and the second point coordinates represent the first observation position (i=1). Accordingly, the respective distance value $d_{1,1}$ representing the distance between the first installation position (i.e. k=1) and the first observation position (i=1) may be determined based on the respective round-trip-time value $RTT_{1,1}$ by the following equations:

$$d_{1,1} = RTT_{1,1} \cdot \frac{c}{2}$$

where c is the speed of light.

Based on the above assumptions, the first point coordinates may then be represented by the following two-dimensional vector:

$$\underline{y_1} = \begin{pmatrix} 0 \\ 0 \end{pmatrix},$$

and the second point coordinates may then be represented by the following two-dimensional vector:

$$\underline{x_1} = \begin{pmatrix} 0 \\ d_{1,1} \end{pmatrix}.$$

It is however to be understood that the present invention is not limited to the above assumptions and that the coordinate system may be defined in various different ways.

In step 503, for each of the plurality of installation positions obtained in step 501 apart from the installation position represented by the first point coordinates, respective point coordinates of the coordinate system representing the respective installation position are determined at least partially based on the plurality of signal propagation time parameter and the first point coordinates and the second point coordinates.

For example, the determining in step 503 may be performed by solving a non-linear equation system, wherein the non-linear equation system is formed by a plurality of signal propagation time equations, and wherein each of the plurality of signal propagation time equations is at least partially based on a respective signal propagation time value represented by a respective signal propagation time parameter of the plurality of signal propagation time parameters.

Examples of such a signal propagation time equation are:

$$c \cdot RTT_{i,k} = 2\|\underline{x_i} - \underline{y_k}\|$$

where $\underline{x_i}$ represents the i-th observation position, $\underline{y_k}$ represents the k-th installation position, $RTT_{i,k}$ represents a round-trip-time value of a radio signal travelling between the k-th installation position and the i-th observation position, and c represents the speed of light. Therein, the round-trip-time value $RTT_{i,k}$ may be understood to be represented by a respective signal propagation time parameter of the plurality of signal propagation time parameters associated with the k-th installation position and the i-th observation position. In the following it is assumed that $\underline{x_i}$ and $\underline{y_k}$ are two dimensional vectors and that all k installation positions and all i observation positions are unknown.

Accordingly, the number of signal propagation time equations is i·k and the number of unknowns is 2·i+2·k (i.e. two point coordinates for each installation position and each observation position). By considering the first point coordinates and the second point coordinates selected in step 502, the number of signal propagation time equations is reduced by 1 (i.e. i·k−1) and the number of unknowns by 4 (i.e. 2·i+2·k−4).

The non-linear equation system formed by these signal propagation time equations may for example be solved according to the Levenberg-Marquardt algorithm. For example, the problem defined by the non-linear equation system may be simply expressed as follows $$F\begin{pmatrix} x \\ y \end{pmatrix} = \underline{0},$$

where $\underline{x}$ and $\underline{y}$ are the vectors representing point coordinates representing the k installation positions and the i observation positions, respectively. The solution of this problem determines, for each of the k installation positions and the i observation positions (e.g. apart from the first installation position and the first observation position), respective point coordinates such that the signal propagation time equations are fulfilled. Accordingly, the point coordinates obtained as a solution of the problem together with the first point coordinates and the second point coordinates may be considered to be a representation of relative locations of the plurality of installation positions (i.e. k installation positions) and the plurality of observation positions (i.e. i observation positions) in the local coordinate system. Each of these point coordinates may be understood to represent one of (1) a respective installation position of the plurality of installation positions and (2) a respective observation position of the plurality of observation positions.

The method according to flowchart 500 thus provides a method for determining a representation of the relative locations of the plurality of installation positions (i.e. k installation positions) and the plurality of observation positions (i.e. i observation positions) only based on signal propagation time value parameters representing signal propagation time values like round-trip-time values determined by mobile devices without any further information. It is thus no longer necessary to manually capture the plurality of installation positions.

As disclosed in more detail above, if position parameters representing at least three absolute positions of the k installation positions and the i observation positions are obtained (e.g. as geographical coordinates of a global coordinate system like WGS-84), then the local coordinate system may be fixed by fixing or mapping the point coordinates of the local coordinate system representing these positions of the k installation positions to their absolute positions. Based on the accordingly, fixed local coordinate system (e.g. fixed to at least three fixed positions on earth), for each of the point coordinates of the coordinate system representing the plurality of installation positions of WLAN access points 300-1 to 300-5, a respective absolute position may then be determined. It is to be understood that this fixing of the local coordinate system may be performed in step 502 or 503 (e.g. when solving the non-linear equation system) or at a later point of time.

Moreover, positioning server 200 may determine, at least partially based on the point coordinates of the coordinate system representing the plurality of installation positions in step 503, positioning support information representing the plurality of installation positions.

The positioning support information may be configured to enable a mobile device like mobile device 400-1 or 400-2 to determine a position estimate of its present position at least partially based on one or more round-trip-time values determined by the mobile device. To this end, the positioning support information may represent the plurality of installation positions of the plurality of radio devices in form of absolute positions (e.g. by containing or representing, for each of the plurality of installation positions, respective geographical coordinates) or relatively to each other (e.g. by containing or representing, for each of the plurality of installation positions, the respective point coordinates of the coordinate system). If the mobile device determines at least three round-trip-time values, for example each round-trip-time values relating to the time period it took for a respective radio signal for travelling between the present position of the mobile device and a respective one of three different of WLAN access points 300-1 to 300-5, a position estimate of the present position of the mobile device may be determined based on the at least three installation positions of the three different of WLAN access points 300-1 to 300-5 represented by the positioning support information by means of trilateration (e.g. by determining the distance between the present position and the three different installation positions based on the determined at least three different round-trip-time values). The position estimate may at least represent the present position of the mobile device relative to the at least three installation positions. If the positioning support information represent the at least three installation positions absolutely, the position estimate may represent the present position of the mobile device absolutely as well.

For example, positioning server 200 may communicate the positioning support information to mobile devices 400-1 and 400-2 (e.g. via communication paths 101 and 102) to enable them to determine position estimates of their present position if they are located within the predetermined environment of system 100.

It is to be understood that the orders of the steps of flowchart 500 is only exemplary and that the steps may also have a different order if possible. Furthermore, it is also possible that two or more steps may be performed in one step.

Figure 6:
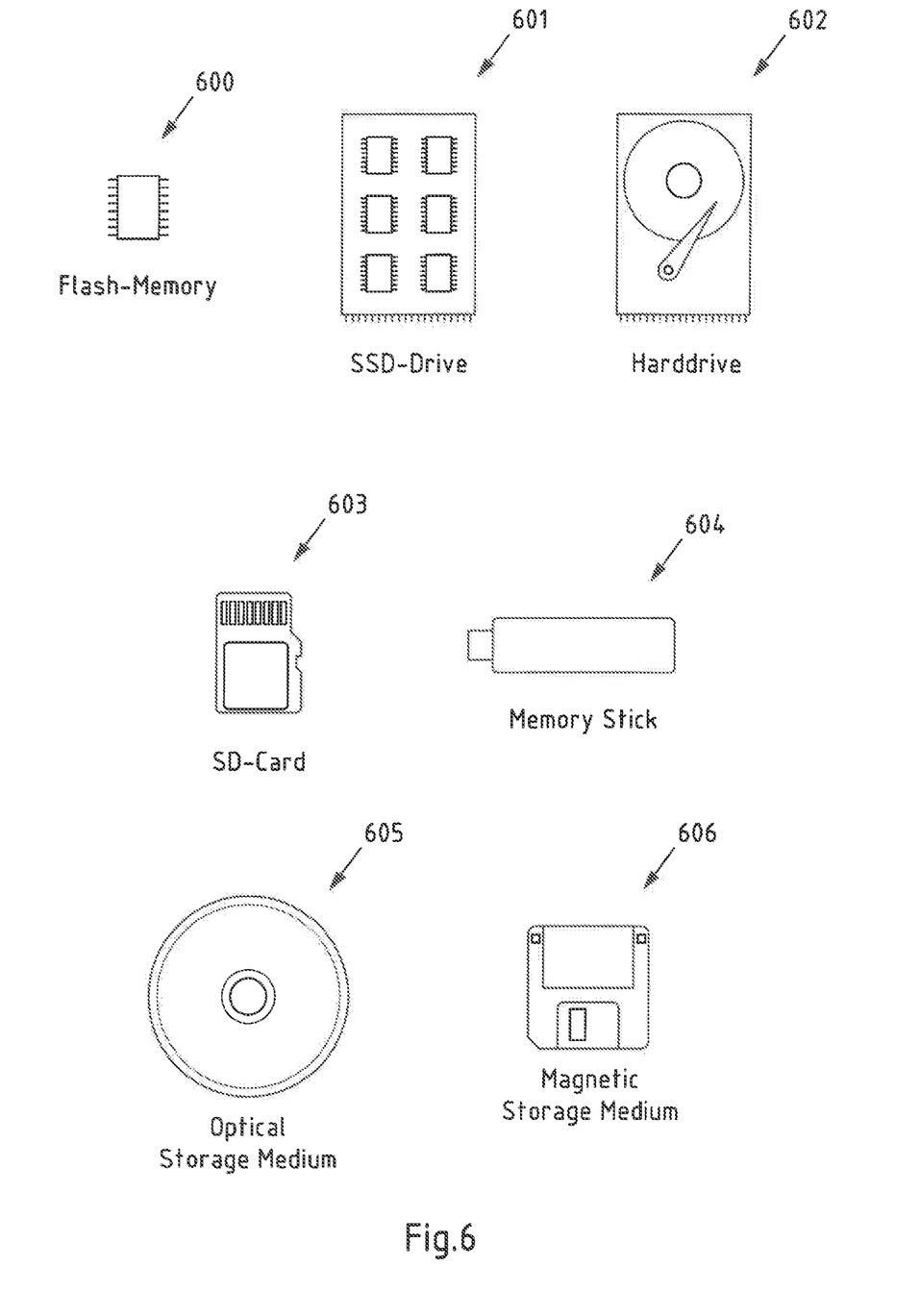
FIG. 6 is a schematic illustration of examples of tangible and non-transitory storage media according to the invention.

FIG. 6 is a schematic illustration of examples of tangible and non-transitory computer-readable storage media according to the present invention that may for instance be used to implement memory 202 of FIG. 2, memory 302 of FIG. 3 and memory 402 of FIG. 4. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201, 301 and 401 of FIGS. 2, 3 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method for determining a plurality of installation positions of a plurality of radio devices, said method comprising:
obtaining a plurality of signal propagation time parameters, wherein each of said plurality of signal propagation time parameters is associated with a respective installation position of said plurality of installation positions and a respective observation position, and wherein each of said plurality of signal propagation time parameters is representative of a respective signal propagation time value of one or more radio signals traveling between said respective installation position and said respective observation position, selecting a signal propagation time parameter of said plurality of signal propagation time parameters for defining a coordinate system, defining said coordinate system by (a) selecting first point coordinates of said coordinate system to represent said installation position associated with said selected signal propagation time parameter, and (b) selecting second point coordinates of said coordinate system to represent said observation position associated with said selected signal propagation time parameter, and determining, for each of said plurality of installation positions apart from said installation position represented by said first point coordinates, respective point coordinates of said coordinate system representing said respective installation position at least partially based on said plurality of signal propagation time parameter and said first point coordinates and said second point coordinates, wherein determining, for each of said plurality of installation positions apart from said installation position represented by said first point coordinates, respective point coordinates of said coordinate system representing said respective installation position, comprises solving a non-linear equation system, wherein said non-linear equation system is formed by a plurality of signal propagation time equations, and wherein each of said plurality of signal propagation time equations is at least partially based on a respective signal propagation time value represented by a respective signal propagation time parameter of said plurality of signal propagation time parameters.

2. The method according to claim 1, wherein said first point coordinates and said second point coordinates are selected such that a distance between said first point coordinates and said second point coordinates is proportional to said signal propagation time value represented by said selected signal propagation time parameter.

3. The method according to claim 1, wherein one of said first point coordinates and said second point coordinates are origin coordinates of said coordinate system.

4. The method according to claim 1, said method further comprising:
determining, for each of said observation positions apart from said observation position represented by said second point coordinates, respective point coordinates of said coordinate system representing said respective observation position at least partially based on said plurality of signal propagation time parameter and said first point coordinates and said second point coordinates.

5. The method according to claim 1, wherein said determining, for each of said plurality of installation positions apart from said installation position represented by said first point coordinates, respective point coordinates of said coordinate system representing said respective installation position further comprises determining said plurality of plurality of signal propagation time equations by:
determining, for each of said plurality of signal propagation time parameters, a respective signal propagation time equation of said plurality of respective signal propagation time equations, wherein said point coordinates of said coordinate system representing said respective installation position associated with said respective signal propagation time parameter is an unknown variable of said respective signal propagation time equation, and wherein said respective signal propagation time value represented by said respective signal propagation time parameter is a parameter of said respective signal propagation time equation.

6. The method according to claim 1, wherein said non-linear equation system is solved according to the Levenberg-Marquardt algorithm.

7. The method according to claim 1, wherein said point coordinates of said coordinate system represent said plurality of installation positions of said plurality of radio devices relative to each other.

8. The method according to claim 1, wherein said coordinate system is a two-dimensional coordinate system, and/or wherein each of said plurality of radio devices resides on the same floor of a building or a complex of buildings.

9. The method according to claim 1, said method further comprising:
determining, for each of said point coordinates of said coordinate system representing said plurality of installation positions of said plurality of radio devices, a respective absolute position if position parameters representing at least three absolute positions of said installation positions of said plurality of installation positions and said observation positions associated with said plurality of signal propagation time parameters are obtained.

10. The method according to claim 1, said method further comprising at least one of:
determining, at least partially based on said point coordinates of said coordinate system representing said plurality of installation positions of said plurality of radio devices, positioning support information representing said plurality of installation positions for determining a position estimate of a mobile device at least partially based on one or more signal propagation time values determined by said mobile device; or
determining, at least partially based on said positioning support information and one or more signal propagation time values determined by a mobile device, a position estimate of said mobile device.

11. The method according to claim 1, wherein said plurality of signal propagation time parameters is obtained from a plurality of mobile devices, and wherein each of said of signal propagation time parameters is representative of a respective signal propagation time value captured by a respective mobile device of said plurality of mobile devices.

12. The method according to claim 1, wherein each of said radio signal propagation time value is one of:
a round-trip-time value; or
a one-way-time value.

13. A non-transitory computer readable storage medium storing computer program code, the computer program code when executed by a processor of an apparatus causing said apparatus to:
obtain a plurality of signal propagation time parameters, wherein each of said plurality of signal propagation time parameters is associated with a respective installation position of said plurality of installation positions and a respective observation position, and wherein each of said plurality of signal propagation time parameters is representative of a respective signal propagation time value of one or more radio signals traveling between said respective installation position and said respective observation position,
select a signal propagation time parameter of said plurality of signal propagation time parameters for defining a coordinate system,
define said coordinate system by (a) selecting first point coordinates of said coordinate system to represent said installation position associated with said selected signal propagation time parameter, and (b) selecting second point coordinates of said coordinate system to represent said observation position associated with said selected signal propagation time parameter, and determine, for each of said plurality of installation positions apart from said installation position represented by said first point coordinates, respective point coordinates of said coordinate system representing said respective installation position at least partially based on said plurality of signal propagation time parameter and said first point coordinates and said second point coordinates, wherein determining, for each of said plurality of installation positions apart from said installation position represented by said first point coordinates, respective point coordinates of said coordinate system representing said respective installation position, comprises solving a non-linear equation system, wherein said non-linear equation system is formed by a plurality of signal propagation time equations, and wherein each of said plurality of signal propagation time equations is at least partially based on a respective signal propagation time value represented by a respective signal propagation time parameter of said plurality of signal propagation time parameters.

14. An apparatus comprising at least one processor and at least one memory containing computer program code, the at least one memory and the computer program code configured, with the at least one processor, to cause the apparatus at least to:

obtain a plurality of signal propagation time parameters, wherein each of said plurality of signal propagation time parameters is associated with a respective installation position of said plurality of installation positions and a respective observation position, and wherein each of said plurality of signal propagation time parameters is representative of a respective signal propagation time value of one or more radio signals traveling between said respective installation position and said respective observation position, select a signal propagation time parameter of said plurality of signal propagation time parameters for defining a coordinate system, define said coordinate system by (a) selecting first point coordinates of said coordinate system to represent said installation position associated with said selected signal propagation time parameter, and (b) selecting second point coordinates of said coordinate system to represent said observation position associated with said selected signal propagation time parameter, and determine, for each of said plurality of installation positions apart from said installation position represented by said first point coordinates, respective point coordinates of said coordinate system representing said respective installation position at least partially based on said plurality of signal propagation time parameter and said first point coordinates and said second point coordinates, wherein determining, for each of said plurality of installation positions apart from said installation position represented by said first point coordinates, respective point coordinates of said coordinate system representing said respective installation position, comprises solving a non-linear equation system, wherein said non-linear equation system is formed by a plurality of signal propagation time equations, and wherein each of said plurality of signal propagation time equations is at least partially based on a respective signal propagation time value represented by a respective signal propagation time parameter of said plurality of signal propagation time parameters.

15. The apparatus according to claim 14, wherein said first point coordinates and said second point coordinates are selected such that a distance between said first point coordinates and said second point coordinates is proportional to said signal propagation time value represented by said selected signal propagation time parameter.

16. The apparatus according to claim 14, wherein the at least one memory and the computer program code are further configured, with the at least one processor, to cause the apparatus to determine, for each of said observation positions apart from said observation position represented by said second point coordinates, respective point coordinates of said coordinate system representing said respective observation position at least partially based on said plurality of signal propagation time parameter and said first point coordinates and said second point coordinates.

17. The apparatus according to claim 14, wherein the at least one memory and the computer program code are further configured, with the at least one processor, to cause the apparatus to determine, for each of said plurality of installation positions apart from said installation position represented by said first point coordinates, respective point coordinates of said coordinate system representing said respective installation position by determining said plurality of plurality of signal propagation time equations, wherein the at least one memory and the computer program code are configured, with the at least one processor, to cause the apparatus to determine said plurality of plurality of signal propagation time equations by determining, for each of said plurality of signal propagation time parameters, a respective signal propagation time equation of said plurality of respective signal propagation time equations, wherein said point coordinates of said coordinate system representing said respective installation position associated with said respective signal propagation time parameter is an unknown variable of said respective signal propagation time equation, and wherein said respective signal propagation time value represented by said respective signal propagation time parameter is a parameter of said respective signal propagation time equation.

18. The apparatus according to claim 14, wherein the at least one memory and the computer program code are further configured, with the at least one processor, to cause the apparatus to at least one of:

determine, at least partially based on said point coordinates of said coordinate system representing said plurality of installation positions of said plurality of radio devices, positioning support information representing said plurality of installation positions for determining a position estimate of a mobile device at least partially based on one or more signal propagation time values determined by said mobile device; or determine, at least partially based on said positioning support information and one or more signal propagation time values determined by a mobile device, a position estimate of said mobile device.

* * * * *

UNITED STATES PATENT AND TRADEMARK OFFICE
CERTIFICATE OF CORRECTION

PATENT NO. : 11,579,237 B2
APPLICATION NO. : 16/780994
DATED : February 14, 2023
INVENTOR(S) : Lauri Aarne Johannes Wirola et al.

It is certified that error appears in the above-identified patent and that said Letters Patent is hereby corrected as shown below:

In the Claims

In Column 23, Lines 56-57, Claim 5, delete "plurality of plurality of" and insert -- plurality of --, therefor.

In Column 26, Lines 30-31, Claim 17, delete "plurality of plurality of" and insert -- plurality of --, therefor.

In Column 26, Line 34, Claim 17, delete "plurality of plurality of" and insert -- plurality of --, therefor.

Signed and Sealed this
Thirty-first Day of October, 2023

Katherine Kelly Vidal
*Director of the United States Patent and Trademark Office*